United States Patent
Oh et al.

(10) Patent No.: US 11,205,771 B2
(45) Date of Patent: Dec. 21, 2021

(54) METHOD FOR PREPARING ELECTRODE FOR SECONDARY BATTERY

(71) Applicant: LG Chem, Ltd., Seoul (KR)

(72) Inventors: Sei Woon Oh, Daejeon (KR); Soo Hyun Lim, Daejeon (KR); Sun Hwak Woo, Daejeon (KR); Jinseo Park, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/606,964

(22) PCT Filed: Nov. 30, 2018

(86) PCT No.: PCT/KR2018/015112
§ 371 (c)(1),
(2) Date: Oct. 21, 2019

(87) PCT Pub. No.: WO2019/108027
PCT Pub. Date: Jun. 6, 2019

(65) Prior Publication Data
US 2020/0335766 A1  Oct. 22, 2020

(30) Foreign Application Priority Data
Dec. 1, 2017  (KR) .......................... 10-2017-0164090

(51) Int. Cl.
*H01M 4/21* (2006.01)
*H01M 4/04* (2006.01)
(Continued)

(52) U.S. Cl.
CPC ........... *H01M 4/0404* (2013.01); *H01M 4/02* (2013.01); *H01M 4/0435* (2013.01);
(Continued)

(58) Field of Classification Search
CPC .... H01M 10/00; H01M 10/04; H01M 4/0404; H01M 4/02; H01M 4/21
(Continued)

(56) References Cited

U.S. PATENT DOCUMENTS 6,235,066 B1 * 5/2001 Inuzuka ............ H01M 10/0525
29/623.4
8,821,593 B2    9/2014 Sasaki et al.
(Continued)

FOREIGN PATENT DOCUMENTS

JP    2009081072 A    4/2009
JP    2010146993 A    7/2010
(Continued)

OTHER PUBLICATIONS

International Search Report including Written Opinion for Application No. PCT/KR2018/015112, dated Mar. 15, 2019, pp. 1-11.

*Primary Examiner* — Tabassom Tadayyon Eslami
(74) *Attorney, Agent, or Firm* — Lerner, David, Littenberg, Krumholz & Mentlik, LLP

(57) ABSTRACT

The present invention provides a method for preparing an electrode for a secondary battery, including the steps of: (i) mixing and kneading an active material, a binder, and a conductive material together with a solvent to prepare a slurry in the form of a paste having a solid content of 70 to 90 wt %; (ii) positioning the slurry in the form of a paste on a current collector; and (iii) passing the current collector through a rolling apparatus together with the slurry in the form of a paste to simultaneously press it while forming an electrode coating layer on the current collector.

9 Claims, 1 Drawing Sheet

(51) Int. Cl.
  *H01M 4/139* (2010.01)
  *H01M 4/62* (2006.01)
  *H01M 4/02* (2006.01)
  *H01M 10/00* (2006.01)

(52) U.S. Cl.
  CPC .......... *H01M 4/139* (2013.01); *H01M 4/623* (2013.01); *H01M 10/00* (2013.01)

(58) Field of Classification Search
  USPC ................................................. 427/464, 541
  See application file for complete search history.

(56) References Cited

U.S. PATENT DOCUMENTS

| | | | |
|---|---|---|---|
| 9,812,708 B2 | 11/2017 | Koo et al. | |
| 10,044,026 B2 | 8/2018 | Sonobe et al. | |
| 10,276,855 B2 | 4/2019 | Uchida et al. | |
| 2001/0012588 A1* | 8/2001 | Kaido | H01M 4/0402 429/233 |
| 2010/0132213 A1* | 6/2010 | Ulrich | F26B 13/18 34/388 |
| 2011/0262811 A1* | 10/2011 | Kinoshita | H01M 4/131 429/217 |
| 2013/0078365 A1 | 3/2013 | Mori et al. | |
| 2015/0280208 A1 | 10/2015 | Kimura et al. | |
| 2016/0149217 A1* | 5/2016 | Uchida | H01M 4/624 429/232 |
| 2016/0149224 A1* | 5/2016 | Okuno | H01M 10/0563 429/345 |
| 2017/0110734 A1 | 4/2017 | Tanaka | |

FOREIGN PATENT DOCUMENTS

| | | | |
|---|---|---|---|
| JP | 5500395 B2 | 5/2014 | |
| JP | 2014535136 A | 12/2014 | |
| JP | 2015185509 A | 10/2015 | |
| JP | 2016018762 A | 2/2016 | |
| JP | 2016081829 A | 5/2016 | |
| KR | 20110066154 A | 6/2011 | |
| KR | 20160039979 A | 4/2016 | |
| KR | 20160140631 A | 12/2016 | |
| KR | 20170076668 A | 7/2017 | |

* cited by examiner

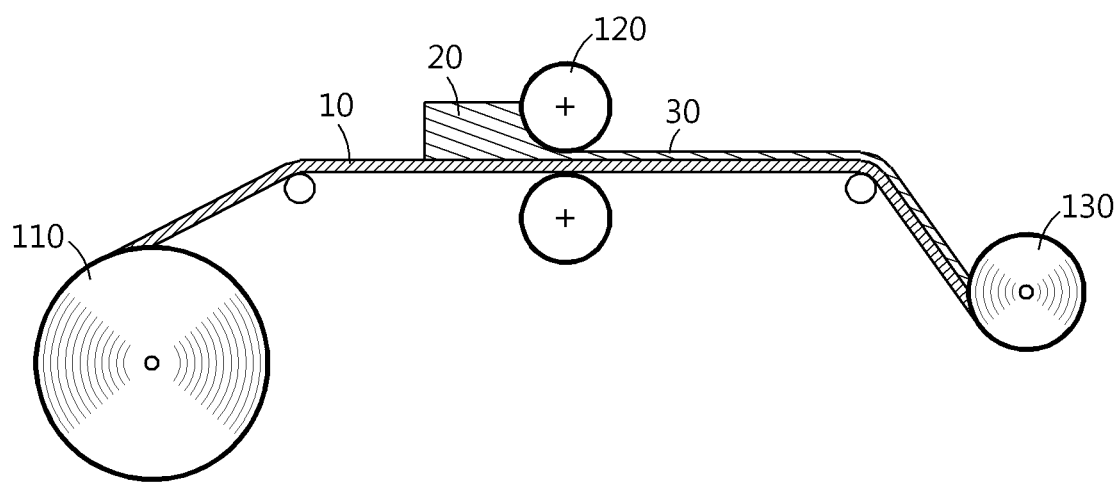

METHOD FOR PREPARING ELECTRODE FOR SECONDARY BATTERY

CROSS-REFERENCE TO RELATED APPLICATION(S)

This application is a national phase entry under 35 U.S.C. § 371 of International Application No. PCT/KR2018/015112, filed Nov. 30, 2018, which claims priority to Korean Patent Application No. 10-2017-0164090 filed on Dec. 1, 2017, the disclosures of which are herein incorporated by reference in their entirety.

TECHNICAL FIELD

The present invention relates to a method for preparing an electrode for a secondary battery, and more specifically, to a method for preparing an electrode for a secondary battery that forms an electrode active material more conveniently and efficiently.

BACKGROUND ART

With an increase in the development of technology of mobile devices and demand thereof, there is a rapidly increasing demand for rechargeable secondary batteries capable of miniaturization and large scale. Further, among the secondary batteries, lithium secondary batteries having high energy density and voltage have been commercialized and are being widely used.

Lithium secondary batteries have a structure wherein an electrolyte containing lithium salts is impregnated in an electrode assembly in which a porous separator is interposed between electrodes including an active material coated on a current collector, namely, a cathode and an anode, and the electrode is prepared by forming an electrode coating layer on a current collector through a process of mixing/dispersing the active material, a binder, and a conductive material in a solvent to prepare a slurry, a coating process of coating the slurry on a current collector in the form of a thin film and drying it, and a pressing process for increasing the capacity density of the electrode after the coating process and increasing adhesion between the current collector and the active material.

In the electrode preparation method of the prior art, a liquid slurry having a solid content of 30 to 60 wt % was made during the mixing process and used for the coating process. In this case, a solvent is evaporated during the drying process after coating, thus influencing the arrangement of solid contents to form a coating layer of a nonuniform distribution. Particularly, since particles having low density such as a binder move toward the electrode surface in a vertical direction from the current collector, adhesion between the electrode layer and the current collector decreases. The drying process is commonly conducted by passing a slurry coating layer through a drying tunnel having a length of about 50 m under conditions of a temperature of 60 to 180° C. and 2 to 10 m/min.

In the electrode preparation method of the prior art, a slurry prepared in the mixing process is transferred to a storage mixer and stored, wherein a complicated process of transferring the slurry from the storage mixer to a head tank and storing it is required.

Meanwhile, the pressing process is a process of preheating the electrode after the coating process, and then passing the electrode between two rolls heated to a high temperature to press it to a desired thickness. Commonly, the pressing process is progressed so as to decrease the thickness of the coating layer by 1 to 50%, specifically 10 to 40%, wherein as a pressure is applied, damage such as wrinkles or curling may be generated in the current collector by the roller.

Therefore, there is a need to develop a technology capable of fundamentally solving the problem.

DISCLOSURE

Technical Problem

In order to solve the above problem, it is an object of the present invention to provide a method for preparing an electrode for a secondary battery that improves complicated electrode preparation processes more conveniently and efficiently while securing uniformity of an electrode coating layer.

Technical Solution

According to one embodiment of the present invention, a method for preparing an electrode for a secondary battery is provided, which includes the steps of:

(i) mixing and kneading an active material, a binder, and a conductive material together with a solvent to prepare a slurry in the form of a paste having a solid content of 70 to 90 wt %;

(ii) positioning the slurry in the form of a paste on a current collector; and (iii) passing the current collector through a rolling apparatus together with the slurry in the form of a paste to simultaneously press it while forming an electrode coating layer on the current collector.

The rolling apparatus may include one or two pressing rolls.

The electrode coating layer formed in step (iii) may not be subjected to a separate drying process, and the solvent included in the slurry may be removed through a post-treatment process that is progressed later.

In step (ii), the current collector may be fed by an unwinding roll interlocked at a predetermined interval in the rolling apparatus.

In step (iii), the current collector on which the electrode coating layer is formed may be transferred to a winding roll interlocked at a predetermined interval in an opposite direction to that of the unwinding roll.

Preferably, the slurry in the form of a paste may have a solid content of 80 to 90%.

Further, the binder may be included in the content of 0.01 to 5 wt %, based on 100 wt % of the slurry.

The binder may be one or more selected from the group consisting of a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, styrene butylene rubber (SBR), and a fluorine-containing polymer.

The slurry in the form of a paste may further include a thickener.

Porosity of the electrode coating layer prepared in step (iii) may be 10 to 40%.

Advantageous Effects

According to the preparation method of an electrode, by simultaneously progressing coating and pressing processes using an electrode slurry in the form of a paste having a high solid content, an electrode coating may be formed on a current collector more conveniently and efficiently.

In addition, since the slurry in the form of a paste having a high solid content includes a very small amount of solvents, the solvents may be removed through a post-treatment process without a separate drying process, and the movement of electrode material having low density such as a binder may be minimized, thus forming a coating layer in which electrode material is uniformly dispersed.

Further, the simultaneous progress of the coating and pressing processes may minimize damage of a current collector.

DESCRIPTION OF DRAWING

FIG. 1 is a mimetic diagram showing the process of simultaneously conducting coating and pressing processes in the electrode preparation method according to one embodiment of the present invention.

BEST MODE

Hereinafter, the terms used in the specification and the claims should not be limitedly interpreted as common or dictionary meanings, and should be interpreted as meanings and concepts corresponding to the technical idea of the present invention, based on the principle that the inventors may appropriately define the concepts of the terms so as to explain one's own invention in the best way.

The method for preparing an electrode for a secondary battery according to one embodiment of the present invention includes the steps of:

(i) mixing and kneading an active material, a binder, and a conductive material together with a solvent to prepare a slurry in the form of a paste having a solid content of 70 to 90 wt %;

(ii) positioning the slurry in the form of a paste on a current collector; and (iii) passing the current collector through a rolling apparatus together with the slurry in the form of a paste to simultaneously press it while forming an electrode coating layer on the current collector.

First, in step (i), the electrode active material, the binder, and the conductive material are mixed with a solvent to prepare the slurry in the form of a paste.

Commonly, a slurry for forming an electrode coating layer is a liquid slurry having a solid content of 30 to 60 wt %. If such a liquid slurry is used, a solvent may be evaporated during a drying process after coating, thus influencing the arrangement of solid contents, and thus, a coating layer with non-uniform distribution may be formed. Particularly, since particles having a low density such a binder tend to move to an electrode surface in a vertical direction from a current electrode, a coating layer with decreased adhesion between an electrode layer and a current collector may be formed.

To the contrary, since the slurry in the form of a paste used in the present invention has a solid content of 70 to 90 wt %, preferably 80 to 90%, dispersion uniformity may be improved during the process of mixing and kneading each material, and a heating value may be decreased during mixing. Particularly, since the slurry in the form of a paste contains a very small amount of solvents, the drying time of the slurry may be reduced, and the movement of electrode material having a low density such as a binder may be minimized during the process of drying the solvent, thereby forming a coating layer in which electrode materials are uniformly dispersed.

The binder that can be used in the present invention is not specifically limited, but preferably, a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, styrene butylene rubber (SBR), a fluorine-containing polymer, and the like may be used alone or in combinations.

The content of the binder is not specifically limited, but it is preferable that the binder is included in the content of 0.01 to 5 wt %, or 0.05 to 5 wt %, based on 100 wt % of the slurry.

The slurry in the form of a paste may further include other additives such as a thickener, a filler, and the like, in addition to the active material, the binder, and the conductive material. The content of the additives may be appropriately controlled in a range where the effect of the present invention is not hindered.

The thickener may be included so as to control the viscosity of the slurry, and a cellulose-based thickener such as carboxymethyl cellulose (CMC) may be used, but the thickener is not limited thereto.

The filler is optionally used as a component for inhibiting the expansion of an electrode, and is not specifically limited as long as it is a fibrous material that does not induce a chemical change in a corresponding battery, and for example, is an olefin polymer such as polyethylene, polypropylene, and the like, or a fibrous material such as glass fiber, carbon fiber, and the like, may be used.

According to one embodiment, in case the electrode prepared according to the present invention is used as an anode, styrene butylene rubber (SBR) may be used as a binder, and carboxymethyl cellulose (CMC) may be used as a thickener. In this case, in spite of the high solid content, the viscosity of the slurry may be maintained at an optimum level, and the cracking of the active material layer after coating of the slurry may be prevented.

Alternatively, polyacrylate, or a vinyl alcohol-based water-soluble polymer capable of simultaneously serving as a thickener and a binder may be used. Since the water-soluble polymer has excellent solubility even under a low moisture environment, the solid content of the slurry may be increased.

Meanwhile, in case the electrode prepared according to the present invention is used as a cathode, polyvinylidene fluoride (PVDF) may be used as a binder, but is not necessarily limited thereto.

In case the electrode prepared according to the present invention is used as a cathode, the active material may include active material particles selected from the group consisting of $LiCoO_2$, $LiNiO_2$, $LiMn_2O_4$, $LiCoPO_4$, $LiFePO_4$, and $LiNi_{1-x-y-z}Co_xM1_yM2_zO_2$ (M1 and M2 are each independently one selected from the group consisting of Al, Ni, Co, Fe, Mn, V, Cr, Ti, W, Ta, Mg and Mo; x, y, and z are each independently the atomic fraction of the element constituting the oxide, and $0 \leq x < 0.5$, $0 \leq y < 0.5$, $0 \leq z < 0.5$, and $0 < x+y+z \leq 1$), or a mixture of two or more kinds thereof, and in case the electrode prepared according to the present invention is used as an anode, the active material may include active material particles selected from the group consisting of natural graphite, artificial graphite, and a carbonaceous material; a lithium-containing titanium composite oxide (LTO), metals (Me) such as Si, Sn, Li, Zn, Mg, Cd, Ce, Ni, and Fe; alloys consisting of the metals (Me); an oxide (MeOx) of the metals (Me); and a composite of the metals (Me) with carbon; or a mixture of two or more kinds thereof.

In case the electrode prepared according to the present invention is used as an anode, a material capable of reversible intercalation/deintercalation of lithium ions, lithium metal, an alloy of lithium metal, a material capable of doping and dedoping lithium, or a transition metal oxide may be used as the active material.

As the materials capable of reversible intercalation/deintercalation of lithium ions, any carbonaceous anode active material commonly used in lithium ion secondary batteries may be used, and as representative examples, crystalline carbon, amorphous carbon, or a combination thereof may be used. As examples of the crystalline carbon, graphite such as non-crystalline, laminar, flake, spherical, or fiber-type natural graphite or artificial graphite may be mentioned, and as examples of the non-crystalline carbon, soft carbon (low temperature baked carbon), hard carbon, mesophase pitch carbide, baked cokes, and the like, may be mentioned.

As the alloy of lithium metal, an alloy of lithium with Na, K, Rb, Cs, Fr, Be, Mg, Ca, Sr, Si, Sb, Pb, In, Zn, Ba, Ra, Ge, Al, or Sn may be used.

As the material capable of doping and dedoping lithium, Si, $SiO_x$ (0<x<2), a Si—C composite, a Si-Q alloy (wherein Q is an alkali metal, an alkali earth metal, or a Group 13 to 16 element, a transition metal, a rare earth element, or combinations thereof, provided that it is not Si), Sn, $SnO_2$, a Sn—C composite, Sn—R (wherein R is an alkali metal, an alkali earth metal, or a Group 13 to 16 element, a transition metal, a rare earth element, or combinations thereof, provided that it is not Sn), and the like, may be mentioned. As specific elements of the Q and R, Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po or combinations thereof may be mentioned.

As the transition metal oxide, vanadium oxide, lithium vanadium oxide, and the like may be mentioned.

The conductive material is not specifically limited as long as it has conductivity without inducing a chemical change in a corresponding battery, and for example, conductive materials such as carbon black such as carbon black, acetylene black, ketjen black, channel black, furnace black, lamp black, thermal black, and the like; conductive fiber such as carbon fiber, metal fiber, and the like; metal powder such as fluorocarbon, aluminum, and nickel powder, and the like; conductive whiskers such as zinc oxide, potassium titanate, and the like; a conductive metal oxide such as titanium oxide and the like; and polyphenylene derivatives, and the like, may be mentioned.

When preparing the slurry in the form of a paste, it is preferable to use a solvent that can uniformly disperse the active material and the conductive material, and can be easily evaporated and dried, and specifically, as the solvent, N-methyl-2-pyrrolidone (NMP), acetone, ethylene glycol, acetonitrile, methanol, ethanol, tetrahydrofuran, water, isopropyl alcohol, and the like may be mentioned, but the solvent is not limited thereto.

Further, the mixing for the preparation of the slurry may be conducted by stirring using a common mixer, for example, a paste mixer, a high speed shearing mixer, a homo mixer, and the like.

Next, the slurry in the form of a paste is positioned on a current collector (step ii), and the current collector is passed through a rolling apparatus together with the slurry in the form of a paste, thereby simultaneously conducting coating of the slurry on the current collector and pressing (step iii).

The rolling apparatus may include one or two pressing rolls.

FIG. 1 is a mimetic diagram showing the process of simultaneously conducting a coating process and a pressing process, in the electrode preparation method according to one embodiment of the present invention.

Referring to FIG. 1, a current collector (10) may be fed by an unwinding roll (110) interlocked at a predetermined interval with two pressing rolls (120). The current collector (10) is wound by the unwinding roll (110), and as it is unwound, it is transferred toward the two pressing rolls (120), and before the current collector (10) passes through the pressing rolls (120), the slurry in the form of a paste (20) is positioned. Herein, it is preferable that the slurry in the form of a paste is spread and positioned as wide as possible, so as to smoothly pass between the two pressing rolls (120).

If the current collector (10) and the slurry in the form of a paste (20) pass between the two pressing rolls (120), an electrode coating layer (30) is formed on the current collector (10), and simultaneously, pressing is performed.

As such, since the method of simultaneously conducting coating and pressing using the slurry in the form of a paste uses a very small amount of solvent, the solvent may be removed during a post-treatment process progressed later, without conducting a drying process of the prior art of separately passing through a drying tunnel.

For example, in the prior art, a coating layer prepared using a liquid slurry had to be subjected to a drying process wherein it passes through a drying tunnel having a length of about 50 m under conditions of 60 to 180° C. and 2 to 10 m/min, so as to remove a significant amount of solvents contained in the slurry. However, in the electrode coating layer (30) prepared according to the present invention, solvents contained in a very small amount may be removed through a post-treatment process, for example, convenient drying achieved during the storage period of the prepared electrode, a process of applying heat for lamination of the prepared electrode and a separator, or a drying process performed after completion of electrode assembly, instead of the drying process of the prior art.

If necessary, the current collector and the slurry in the form of a paste may be subjected to a preheating process, before passing through the two pressing rolls, so as to increase the effects of coating and pressing, but the present invention is not limited thereto.

In addition, in case coating and pressing are simultaneously conducted using the slurry in the form of a paste according to the present invention, compared to the case of the prior art wherein the liquid slurry is coated and dried, and then a separate pressing process is conducted, damage of the current collector may be reduced.

For example, in the case of a coating layer prepared using the liquid slurry of the prior art, while the thickness decreases by 1 to 50%, specifically 10 to 40%, through the pressing process, damage such as wrinkles or curling may be generated in the current collector.

However, according to the present invention, the thickness of the electrode coating layer (30) formed by passing through the two pressing rolls (120) may become the final thickness, and since a separate pressing process is not conducted, damage to the current collector such as wrinkles or curling may be minimized.

The current collector (10) on which an electrode coating layer (30) is formed is transferred to a winding roll (130)

interlocked at a predetermined interval with the two pressing rolls (120) in an opposite direction to that of the unwinding roll (110).

The electrode coating layer (30) formed by the above method fulfills porosity in the range of 10 to 40%, or 15 to 35%, even if it does not pass though a separate pressing process, and thus the effects of improving conductivity and restricting physical destruction by the expansion of an electrode may be secured.

Herein, the porosity may be calculated by taking the electrode of a specific area, calculating the density of the electrode coating layer except the current collector, and then comparing with the true density of the total conductive materials included in the electrode coating layer.

Meanwhile, the current collector used in the present invention is not specifically limited as long as it has high conductivity without inducing chemical change in a corresponding battery. For example, stainless steel, aluminum, nickel, baked carbon, or aluminum or stainless steel of which the surface is treated with carbon, nickel, titanium, or silver, and the like, may be used. Further, the current collector may have various shapes such as a film, a sheet, a foil, a net, a porous body, a foam body, a non-woven fabric, and the like. The thickness of the current collector may be in the range of 3~500 μm, but is not limited thereto.

The electrode prepared according to the above preparation method has an electrode coating layer including uniformly dispersed electrode materials on at least one side of a current collector, as explained above.

Thus, the electrode may be usefully used as electrodes for secondary batteries of various kinds such as a stack type, a wound type, a stack and folding type, a cable type, and the like.

For example, in the secondary batteries including a cathode, an anode, a separator interposed between the cathode and the anode, and a non-aqueous electrolyte, at least one of the cathode and the anode may be the electrode prepared according to the preparation method of the present invention.

In the secondary batteries, as the separator used to isolate the anode and a cathode, any porous substrates commonly used in the art may be used, and for example, a porous membrane or a non-woven fabric may be used, and a porous coating layer including inorganic particles and a binder polymer may be further positioned on at least one side of the porous substrate, but the present invention is not specifically limited thereto.

The non-aqueous electrolyte may further include an organic solvent and an electrolyte salt, and the electrolyte salt is a lithium salt. As the lithium salt, those commonly used in a non-aqueous electrolyte for a lithium secondary battery may be used without limitations. For example, the anion of the lithium salt may be one or two or more kinds selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCn^-$, and $(CF_3CF_2SO_2)_2N^-$.

Such a secondary battery may not only be used in a battery cell used as a power supply of a small device, but may also preferably be used as a unit battery in a medium or large size battery module including multiple battery cells. As preferable examples of the medium or large size devices, electric automobiles, hybrid electric automobiles, plug-in hybrid electric automobiles, electric power storage systems, and the like may be mentioned, and particularly, it may be usefully used for hybrid electric automobiles and new renewable energy storage batteries requiring high output.

Although the present invention has been explained by limitative embodiments and drawings, the present invention is not limited thereby, and various modifications and alterations may be made by a person having ordinary knowledge in the art within the technical ideas of the present invention and the equivalent range of the claims described below.

EXAMPLES

Example 1

Carbon black as a conductive material, a 1.5 wt % aqueous solution of carboxymethyl cellulose (CMC) as a thickener, a 40% aqueous solution of styrene butylenes rubber (SBR) as a binder, graphite as an active material, and water as a solvent were used to prepare a slurry in the form of a paste having a solid content of 90 wt %.

The solid content of 90 wt % consisted of 1 wt % of the conductive material, 0.10 wt % of the thickener, 2.0 wt % of the binder, and the remaining part of the active material.

The slurry in the form of a paste was coated on a copper current collector, and simultaneously pressed, using the apparatus of FIG. 1, thus preparing an electrode.

Example 2

An electrode was prepared using the same materials and method as Example 1, except that a slurry in the form of a paste having a solid content of 80 wt % was used.

The solid content of 80 wt % consisted of 1 wt % of the conductive material, 0.3 wt % of the thickener, 2.0 wt % of the binder, and the remaining part of the active material.

Example 3

An electrode was prepared using the same materials and method as Example 1, except that a slurry in the form of a paste having a solid content of 70 wt % was used.

The solid content of 70 wt % consisted of 1 wt % of the conductive material, 0.6 wt % of the thickener, 2.0 wt % of the binder, and the remaining part of the active material.

Comparative Example 1

An electrode was prepared using the same materials and method as Example 1, except that a slurry in the form of a paste having a solid content of 53 wt % was used.

The solid content of 53 wt % consisted of 1 wt % of the conductive material, 1.1 wt % of the thickener, 2.0 wt % of the binder, and the remaining part of the active material.

Experimental Example 1

Comparison of Porosities of Electrode Coating Layers

The porosities of the electrode coating layers of the electrodes prepared in Example 1 and Comparative Example 1 were calculated. Herein, the porosity was calculated by taking the electrode of a specific area and calculating the density of the electrode coating layer except a current collector, and then comparing with the true density of the total electrode materials included in the electrode coating layer.

As the result, the porosity of Example 1 (the thickness of the electrode including a current collector was 120 μm) was about 35%, and the porosity of Comparative Example 1 (the thickness of the electrode including a current collector was 157 μm) was about 50%, and thus, it can be confirmed that Example 1 had an optimum level of porosity without additional pressing process, such that it could be directly used for a battery, but in the case of Comparative Example 1, an additional pressing process is required for use.

Experimental Example 2

Measurement of Electrode Resistance

If a nonconductor such as a binder and a thickener, among the materials constituting an electrode coating layer, is agglomerated, it may act as a resistive layer.

Thus, in order to confirm whether or not the electrode materials were uniformly dispersed in the electrode coating layer, the resistance of each electrode prepared in the examples and comparative examples was measured.

The resistance was measured by a puncture resistance measurement method, wherein a total of 10 electrodes were stacked, a constant pressure in the range of 20 to 100 kgf was applied, and the resistance of the current running through it was measured.

As the experiment results, 150 mohm was exhibited in Example 1, 175 mohm in Example 2, 180 mohm in Example 3, and 202 mohm in Comparative Example 1.

Thus, it can be confirmed that the electrode prepared according to the present invention has excellent performance because electrode materials were uniformly dispersed in the coating layer. To the contrary, it can be confirmed that in the case of Comparative Example 1, the movement of electrode materials was generated during the electrode preparation process, thus generating the agglomeration of electrode materials such as a binder.

EXPLANATION OF SYMBOLS

10: current collector
20: slurry
30: electrode coating layer
110: unwinding roll
120: pressing roll
130: winding roll

The invention claimed is:

1. A method for preparing an electrode for a secondary battery, comprising:
   (i) mixing and kneading an active material, a binder, and a conductive material together with a solvent to prepare a slurry in a form of a paste having a solid content of 70 wt % to 90 wt %;
   (ii) positioning the slurry in the form of paste on a current collector; and
   (ii) passing the current collector through a rolling apparatus together with the slurry in the form of paste to simultaneously press the slurry in the form of paste while forming an electrode coating layer on the current collector, wherein the electrode coating layer formed in the rolling apparatus is not subjected to a separate drying process.

2. The method for preparing an electrode for a secondary battery according to claim 1, wherein the rolling apparatus comprises one or two pressing rolls.

3. The method for preparing an electrode for a secondary battery according to claim 1, wherein during the passing the current collector through the rolling apparatus, the current collector is fed by an unwinding roll interlocked at a predetermined interval in the rolling apparatus.

4. The method for preparing an electrode for a secondary battery according to claim 3, wherein during the positioning the slurry in the form of paste on the current collector, the current collector on which the electrode coating layer is formed is transferred to a winding roll interlocked at a predetermined interval in an opposite direction to that of the unwinding roll in the rolling apparatus.

5. The method for preparing an electrode for a secondary battery according to claim 1, wherein the slurry in the form of paste has a solid content of 80 wt % to 90 wt %.

6. The method for preparing an electrode for a secondary battery according to claim 1, wherein the binder is included in a content of 0.01 wt % to 5 wt %, based on 100 wt % of the slurry.

7. The method for preparing an electrode for a secondary battery according to claim 1, wherein the binder is one or more selected from the group consisting of a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, styrene butylene rubber (SBR), and a fluorine-containing polymer.

8. The method for preparing an electrode for a secondary battery according to claim 1, wherein the slurry in the form of paste further comprises a thickener.

9. The method for preparing an electrode for a secondary battery according to claim 1, wherein a porosity of the electrode coating layer prepared in the rolling apparatus is 10% to 40%.

* * * * *